US007289552B2

(12) United States Patent
Kwak et al.

(10) Patent No.: US 7,289,552 B2
(45) Date of Patent: Oct. 30, 2007

(54) EFFICIENT JOINT DETECTION

(75) Inventors: Jaeyoung Kwak, Morganville, NJ (US); John W. Haim, Baldwin, NY (US); Ariela Zeira, Huntington, NY (US); Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 760 days.

(21) Appl. No.: 10/644,361

(22) Filed: Aug. 20, 2003

(65) Prior Publication Data

US 2004/0136316 A1    Jul. 15, 2004

Related U.S. Application Data

(60) Provisional application No. 60/404,561, filed on Aug. 20, 2002.

(51) Int. Cl.
*H04B 1/00* (2006.01)
*H03D 27/06* (2006.01)
*G06F 17/14* (2006.01)

(52) U.S. Cl. .................. 375/147; 375/343; 708/403

(58) Field of Classification Search ............. 375/130, 375/140, 147, 150, 316, 343, 340, 346–348; 370/320, 335, 342, 441; 708/400, 402–405, 708/820, 821
See application file for complete search history.

(56) References Cited

U.S. PATENT DOCUMENTS 6,144,711 A    11/2000 Raleigh et al.

6,208,295 B1    3/2001 Dogan et al.

(Continued)

FOREIGN PATENT DOCUMENTS

WO    99/40696    8/1999
WO    02/089346    11/2002

OTHER PUBLICATIONS

Anja Klein, Ghassan Kawas Kaleh and Paul Walter Baier, "Zero Forcing and Minimum Mean-Square-Error Equalization for Multiuser Detection in Code-Division Multiple-Access Channels," IEEE Transactions on Vehicular Technology, vol. 45, No. 2, May 1996.

(Continued)

*Primary Examiner*—Jay K Patel
*Assistant Examiner*—Vineeta Panwalkar
(74) *Attorney, Agent, or Firm*—Volpe and Koenig, P.C.

(57) ABSTRACT

K data signals, or bursts, are transmitted over a shared spectrum in a code division multiple access communication format. A combined signal is received and sampled over the shared spectrum, as a plurality of received vector versions. The combined signal includes the K transmitted data signals. A plurality of system matrices and an associated covariance matrix using codes and estimated impulse responses of the K data signals is produced. Each system matrix corresponds to a received vector version. The system and covariance matrices are extended and approximated as block circulant matrices. A diagonal matrix of each of the extended and approximated system and covariance matrices are determined by prime factor algorithm-fast Fourier transform (PFA-FFT) without division of the matrix. The received vector versions are extended. A product of the diagonal matrices and the extended received vector versions is taken. An inverse block discrete Fourier transform is performed by a PFA-FFT on a result of the product to produce the estimated data of the K data signals.

59 Claims, 8 Drawing Sheets

U.S. PATENT DOCUMENTS

| | | | |
|---|---|---|---|
| 6,252,540 B1 | 6/2001 | Hale et al. | |
| 6,370,129 B1 | 4/2002 | Huang | |
| 6,424,596 B1 | 7/2002 | Donald | |
| 6,625,203 B2 | 9/2003 | De et al. | |
| 6,952,460 B1* | 10/2005 | Van Wechel et al. | 375/350 |
| 2002/0146078 A1* | 10/2002 | Gorokhov et al. | 375/260 |
| 2003/0021335 A1 | 1/2003 | De et al. | |
| 2003/0026325 A1 | 2/2003 | De et al. | |

OTHER PUBLICATIONS

Anja Klein, "Data Detection Algorithms Specially Designed for the Downlink of CDMA Mobile Radio Systems," IEEE 47th Vehicular Technology Conference, Phoenix, AZ, USA, May 4-7, 1997.

H.R. Karimi and N.W. Anderson, "A Novel and Efficient Solution to Block-Based Joint-Detection Using Approximate Cholesky Factorization," Motorola GSM Products Division, Swindon, UK, 1998.

PA Consulting Group/Racal Instruments Ltd., "Low Cost MMSE-BLE-SD Algorithm for UTRA TDD Mode Downlink," ETSI STC SMG2 Layer 1 Expert Group, Helsinki, Finland, Sep. 8-11, 1998.

Anja Klein and Paul W. Baier, "Linear Unbiased Data Estimation in Mobile Radio Systems Applying CDMA," IEEE Journal on Selected Areas in Communications, vol. 11, No. 7, Sep. 1993.

Vollmer et al., "Comparative Study of Joint-Detection Techniques for TD-CDMA Based Mobile Radio Systems", IEEE Journal on Selected Areas in Communications, IEEE, vol. 19, No. 8, Aug. 2001, pp. 1461-1475.

Pan et al., "Low Complexity Data Detection Using Fast Fourier Transform Decomposition of Channel Correlation Matrix", 2001 IEEE Global Telecommunications Conference, vol. 2 of 6, Nov. 2001, pp. 1322-1326.

Klein et al., "Zero Forcing and Minimum Mean-Square-Error Equalization for Multiuser Detection in Code-Division Multiple-Access Channels," IEEE Transactions on Vehicular Technology, vol. 45, No. 2, May 1996.

Klein, "Data Detection Algorithms Specially Designed for the Downlink of CDMA Mobile Radio Systems," IEEE 47th Vehicular Technology Conference, Phoenix, Arizona, US, May 1997.

Karimi et al., " A Novel and Efficient Solution to Block-Based Joint-Detection Using Approximate Cholesky Factorization," Motorola GSM Products Division, Swindon, UK, 1998.

PA Consulting Group/Racal Instruments Ltd., "Low Cost MMSE-BLE-SD Algorithm for UTRA TDD Mode Downlink," ETSI STC SMG2 Layer 1 Expert Group, Helsinki, Finland, Sep. 1998.

Klein et al., "Linear Unbiased Data Estimation in Mobile Radio Systems Applying CDMA," IEEE Journal on Selected Areas in Communications, vol. 11, No. 7, Sep. 1993.

Benventuto et al., "Joint Detection with Low Computational Complexity for Hybrid TD-CDMA Systems," Vehicular Technology Conference, 1999, VTC IEEE VTS 50th, Amsterdam, The Netherlands, Sep. 1999.

Das et al., "Computationally Efficient Multiuser Detectors," Personal, Indoor and Mobile Radio Communications, 1997, The 8th Annual IEEE International Symposium on Helsinki, Finland, Sep. 1997.

Lee et al., "A Fast Computation Algorithm for the Decision Feedback Equalizer," IEEE Transactions on Communications, vol. 43, No. 11, Nov. 1999.

Vollmer et al., "Comparative Study of Joint-Detection Techniques for TD-CDMA Based Mobile Radio Systems", IEEE Journal in Selected Areas in Communications, IEEE, vol. 19, No. 8, Aug. 2001, pp. 1461-1475.

Pan et al., "Low Complexity Data Detection Using Fast Fourier Transform Decomposition of Channel Correlation Matrix", 2001 IEEE Global Telecommunications Conference, vol. 2 of 6, Nov. 2001, pp. 1322-1326.

3G TS 25.221 V3.2.0, 2000-03, "ULTRA (TDD) physical channels and mapping of transport channels onto physical channels," 3rd Generation Partnership Project, Technical Specification Group RAN WG1. (www.3gpp.org).

3G TS 25.221 V4.0.0, 2001-03, "ULTRA (TDD) physical channels and mapping of transport channels onto physical channels," 3rd Generation Partnership Project, Technical Specification Group RAN WG1. (www.3gpp.org).

3G TS 25.221 V4.2.0, 2001-09, "ULTRA (TDD) physical channels and mapping of transport channels onto physical channels," 3rd Generation Partnership Project, Technical Specification Group RAN WG1. (www.3gpp.org).

J. Blanz, A. Klein, M. NaBhan, and A.Steil, "Performance of a cellular hybrid C/TDMA mobile radio system applying joint detection and coherent receiver antenna diversity," IEEE. J. Select.Areas Commun., vol. 12, pp. 568-579, May 1994.

G.K. Kaleh, "Channel equalization for block transmission systems," IEEE J. Select. Areas Commun., vol. 13, pp. 110-120, Jan. 1995.

P. Jung and J. Blanz, "Joint detection with coherent receiver antenna diversity in CDMA mobile radio systems," IEEE Trans. Veh. Technol., vol. 44, pp. 76-88, Feb. 1995.

N. Benvenuto and G. Sostrato, "Joint detection with low computational complexity for hybrid TD-CDMA systems," IEEE J. Select. Areas Commun., vol. 19, pp. 245-253, Jan. 2001.

M. Vollmer, J. Götze, M. Haardt, "Joint-Detection using Fast Fourier Tansforms in TD-CDMA based Mobile Radio Systems." International Conference on Telecommunications, Cheju, Korea, Jun. 1999.

* cited by examiner

EFFICIENT JOINT DETECTION

This application claims priority to U.S. Provisional Application No. 60/404,561, filed Aug. 20, 2002.

BACKGROUND

FIG. 1 is an illustration of a wireless communication system 10. The communication system 10 has base stations $12_1$ to $12_5$ (12) which communicate with user equipments (UEs) $14_1$ to $14_3$ (14). Each base station 12 has an associated operational area, where it communicates with UEs 14 in its operational area.

In some communication systems, such as frequency division duplex using code division multiple access (FDD/CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into timeslots for communication. A communication sent in such a system will have one or multiple associated codes and timeslots assigned to it.

Since multiple communications may be sent in the same frequency spectrum and at the same time, a receiver in such a system must distinguish between the multiple communications. One approach to detecting such signals is multiuser detection (MUD). In MUD, signals associated with all the UEs 14, are detected simultaneously. For TDD/CDMA systems, one of the popular MUD techniques is a joint detection technique using block linear equalizer (BLE-JD). Techniques for implementing BLE-JD include using a Cholesky or an approximate Cholesky decomposition. These approaches have high complexity. The high complexity leads to increased power consumption, which at the UE 14 results in reduced battery life.

Accordingly, it is desirable to have computationally efficient approaches to detecting received data.

SUMMARY

K data signals, or bursts, are transmitted over a shared spectrum in a code division multiple access communication format. A combined signal is received and sampled over the shared spectrum, as a plurality of received vector versions. The combined signal includes the K transmitted data signals. A plurality of system matrices and an associated covariance matrix using codes and estimated impulse responses of the K data signals is produced. Each system matrix corresponds to a received vector version. The system and covariance matrices are extended and approximated as block circulant matrices. A diagonal matrix of each of the extended and approximated system and covariance matrices are determined by prime factor algorithm-fast Fourier transform (PFA-FFT) without division of the matrices. The received vector versions are extended. A product of the diagonal matrices and the extended received vector versions is taken. An inverse block discrete Fourier transform is performed by a PFA-FFT on a result of the product to produce the estimated data of the K data signals.

BRIEF DESCRIPTION OF THE DRAWING(S)

DETAILED DESCRIPTION OF THE PREFERRED EMBODIMENT(S)

Figure 2:
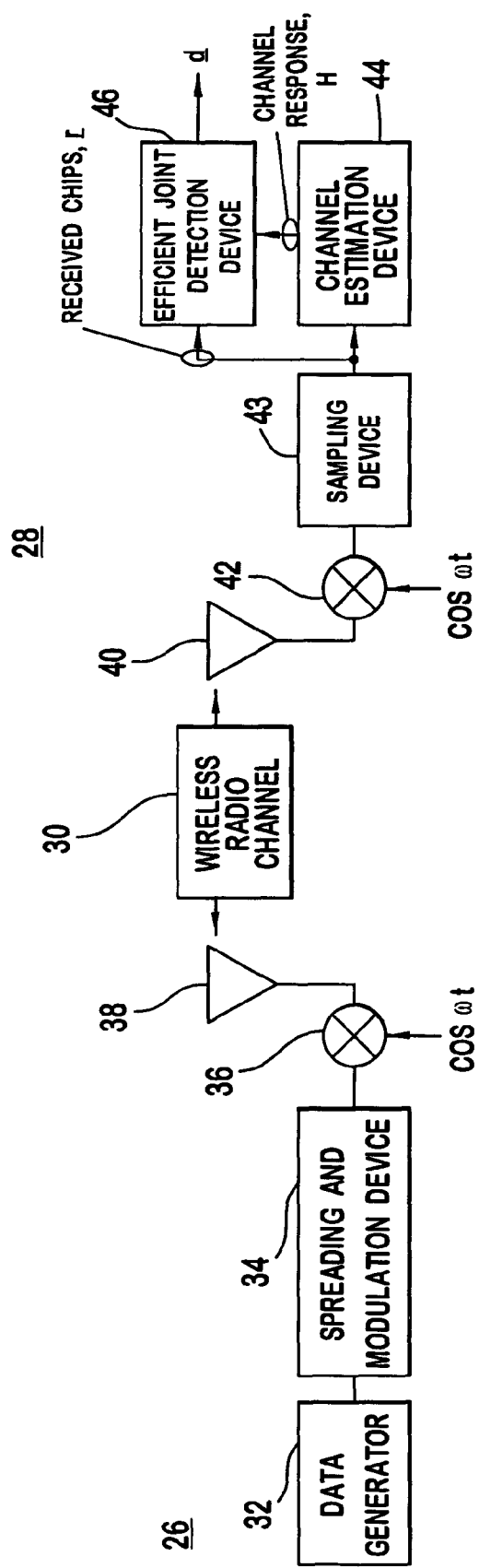
FIG. 2 is a simplified transmitter and an efficient joint detection receiver.

FIG. 2 illustrates a simplified transmitter 26 and receiver 28 using efficient joint detection in a TDD/CDMA communication system, although efficient joint detection is applicable to other systems, such as FDD/CDMA. In a typical system, a transmitter 26 is in each UE 14 and multiple transmitting circuits 26 sending multiple communications are in each base station 12. The joint detection receiver 28 may be at a base station 12, UEs 14 or both.

The transmitter 26 sends data over a wireless radio channel 30. A data generator 32 in the transmitter 26 generates data to be communicated to the receiver 28. A modulation/spreading/training sequence insertion device 34 spreads the data with the appropriate code(s) and makes the spread reference data time-multiplexed with a midamble training sequence in the appropriate assigned time slot, producing a communication burst or bursts.

Figure 1:
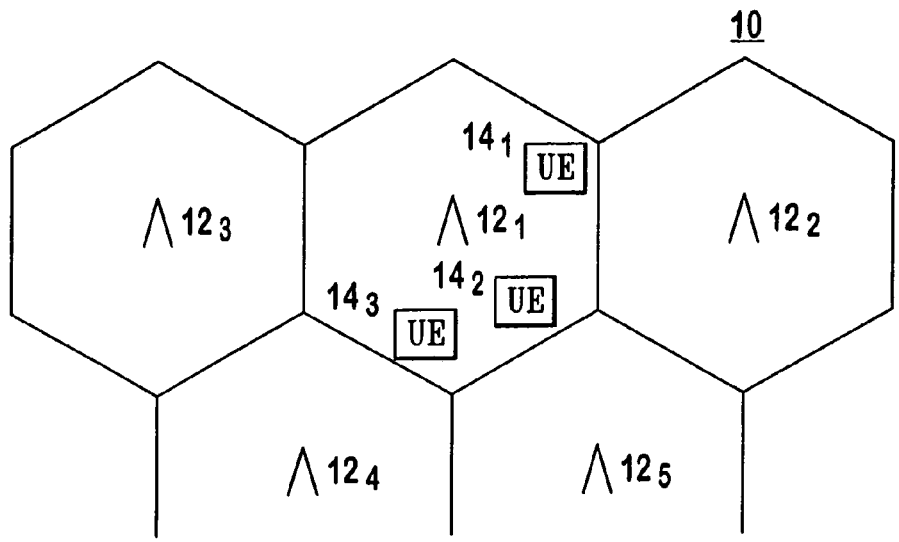
FIG. 1 is a wireless communication system.
Figure 3:
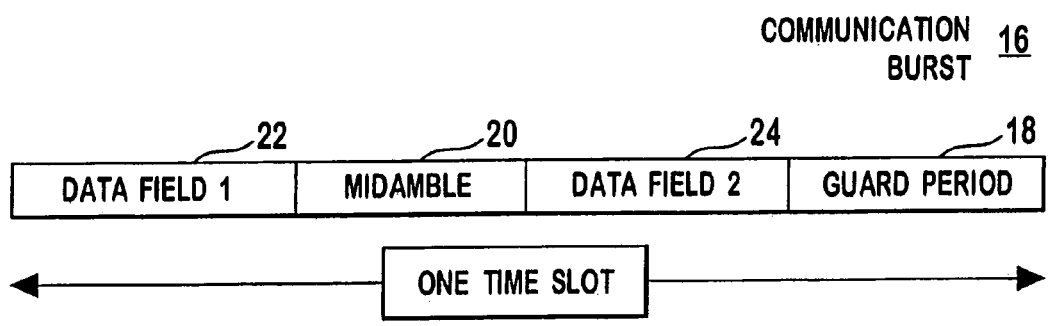
FIG. 3 is an illustration of a communication burst.

A typical communication burst 16 has a midamble 20, a guard period 18 and two data fields 22, 24, as shown in FIG. 3. The midamble 20 separates the two data fields 22,24 and the guard period 18 separates the communication bursts to allow for the difference in arrival times of bursts transmitted from different transmitters 26. The two data fields 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate of the transmitted bursts. The samples are processed, such as by a channel estimation device 44 and an efficient joint detection device 46, in the time slot and with the appropriate codes assigned to the received bursts. The channel estimation device 44 uses the midamble training sequence component in the baseband samples to provide channel information, such as channel impulse responses. The channel information is used by the efficient joint detection device 46 to estimate the transmitted data of the received communication bursts as soft symbols.

The efficient joint detection device 46 uses the channel information provided by the channel estimation device 44 and the known spreading codes used by the transmitter 26 to estimate the data of the desired received communication burst(s).

Although efficient joint detection is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive timeslots.

The receiver 28 receives a total of K bursts that arrive simultaneously, within one observation interval. For the 3GPP UTRA TDD system, each data field of a time slot corresponds to one observation interval. For a frequency division duplex (FDD) CDMA system, the received signals are continuous, i.e., not in bursts. To handle the continuous signals, FDD systems divide the received signals into time segments prior to applying efficient joint detection.

A code used for a $k^{th}$ burst is represented as $\underline{c}^{(k)}$. The K bursts may originate from K different transmitters or for multi-code transmissions, less than K different transmitters.

Each data field of a communication burst has a predetermined number of transmitted symbols, $N_S$. Each symbol is transmitted using a predetermined number of chips, which is the spreading factor, Q. Accordingly, each data field has $N_S \times Q$ chips. After passing through the wireless radio channel, which can introduce a delay spread of up to W−1 chips, the observation interval at the receiver is of length $Q \times N_S + W - 1$ chips.

The symbol response vector $\underline{b}^{(k)}$ as the convolution of the channel response vector $\underline{h}^{(k)}$ with the corresponding spreading code $\underline{c}^{(k)}$ is per Equation 1.

$$\underline{b}^{(k)} = \underline{h}^{(k)} \circ \underline{c}^{(k)} \quad \text{Equation 1}$$

$\circ$ denotes the convolutional operator. The length of $\underline{b}^{(k)}$ is SF+W−1.

Using the symbol response vectors, the system matrix A is defined as per Equation 2.

$$A = \begin{bmatrix} B & & & & \\ & B & & & \\ & & B & & \\ & & & \ddots & \\ & & & & B \end{bmatrix} \begin{matrix} \uparrow \\ Q \\ \downarrow \end{matrix} \quad \text{Equation 2}$$

The size of the matrix is $(N_S \cdot SF + W - 1) \times N_S \cdot K$. A is a block Toeplitz matrix.

Block B is defined as per Equation 3.

$$B = [\underline{b}^{(1)} \, \underline{b}^{(2)} \ldots \underline{b}^{(K)}] \quad \text{Equation 3}$$

The received vector sampled at the chip rate can be represented by Equation 4.

$$\underline{r} = A\underline{d} + \underline{n} \quad \text{Equation 4}$$

The size of vector $\underline{r}$ is $(N_S \cdot SF + W - 1)$ by 1. This size corresponds to the observation interval.

Data vector $\underline{d}$ of size $N_S \cdot K$ by 1 has the form of Equation 5.

$$\underline{d} = [\underline{d}_1^T \, \underline{d}_2^T \ldots \underline{d}_{N_S}^T]^T \quad \text{Equation 5}$$

The sub-vector $\underline{d}_n$ of size K by 1 is composed of the $n^{th}$ symbol of each user and is defined as Equation 6.

$$\underline{d}_n = [d_n^{(1)} \, d_n^{(2)} \ldots d_n^{(K)}]^T, \, n=1, \ldots, N_S \quad \text{Equation 6}$$

The vector $\underline{n}$ of size $(N_S \cdot SF + W - 1)$ by 1 is the background noise vector and is assumed to be white.

Determining $\underline{d}$ using an MMSE solution is per Equation 7.

$$\underline{d} = R^{-1}(A^H \underline{r}) \quad \text{Equation 7}$$

$(\cdot)^H$ represents the hermetian function (complex conjugate transpose). The covariance matrix of the system matrix R for a preferred MMSE solution is per Equation 8.

$$R = A^H A + \sigma^2 I \quad \text{Equation 8}$$

$\sigma^2$ is the noise variance, typically obtained from the channel estimation device 44, and I is the identity matrix.

Using block circulant approximation and block DFT using PFA-FFTs, $\underline{d}$ in Equation 7 can be determined per Equation 9.

$$\underline{d} = F(R^{-1})F(A^H \underline{r}) \quad \text{Equation 9}$$
$$= F^{-1}(\Lambda^{-1}\Lambda_A F(\underline{r}_c))$$

$F(\cdot)$ and $F^{-1}(\cdot)$ indicate the block-DFT function and the inverse block-DFT, respectively. The derivation of the block diagonal matrices $\Lambda$ and $\Lambda_A$ is described subsequently. Instead of directly solving Equation 9, Equation 9 can be solved using the LU decomposition and the forward and backward substitution of the main diagonal block of $\Lambda$. Alternately, Equation 9 can be solved using Cholesky decomposition.

Figure 4A:
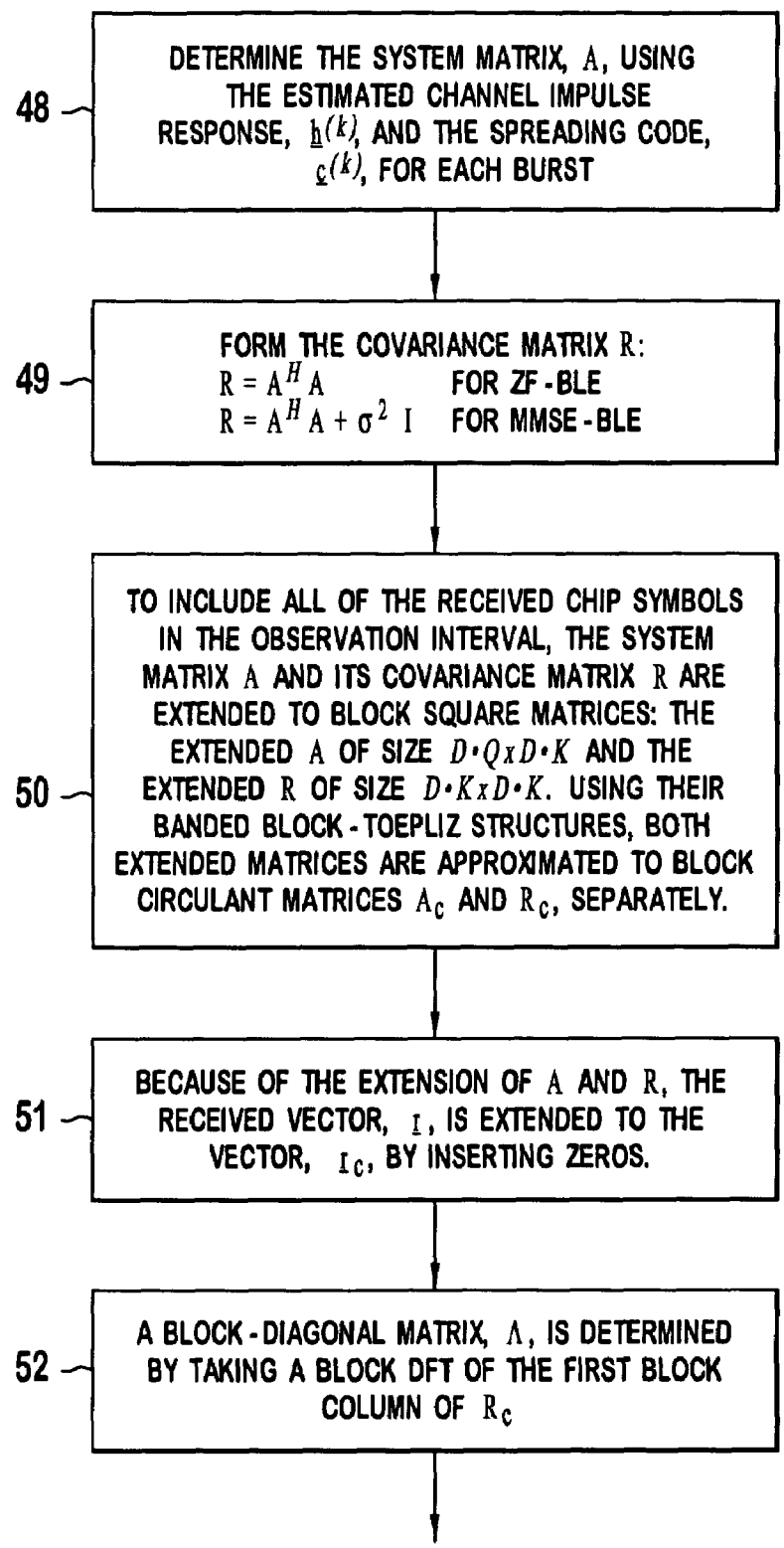
FIGS. 4a and 4b are a flow chart of a preferred embodiment for efficient joint detection.

FIG. 4 is a flowchart for a preferred method of determining the data vector $\underline{d}$ using fast joint detection. The system matrix A is determined using the estimated channel response vector $\underline{h}^{(k)}$ and the spreading code $\underline{c}^{(k)}$ for each burst, 48. R, the covariance matrix of the system matrix, is formed, 49. The system matrix A and its covariance matrix R are extended block square matrices. The extended A is of size $D \cdot Q$ by $D \cdot K$ and the extended R is of size $D \cdot K$ by $D \cdot K$, respectively. D is chosen as per Equation 10.

$$D \geq \left\lceil N_s + \frac{W-1}{Q} \right\rceil \quad \text{Equation 10}$$

Both extended matrices are approximated to block circulant matrices, $A_c$ and $R_c$, 50. Because of the extension of A and R, the received vector, $\underline{r}$, is extended to the vector $\underline{r}_c$ of size $D \cdot SF \times 1$ by inserting zeros, 51. The block-diagonal matrix, $\Lambda$, is determined by taking a block DFT using PFA-FFT of the first block column of $R_c$, 52.

The block DFT of matched filtering $F(A^H \underline{r})$ is approximated by $F(A_c^H \underline{r}_c)$. It is calculated by taking a block DFT using PFA-FFT of $A_c$ and $\underline{r}_c$, 53. Due to the block-diagonal structure of $\Lambda$ and $\Lambda_A$, the blocks $F(\underline{d})^{(i)}$, i=1, ..., D, are of size K by 1 in $F(\underline{d})$. They are determined by performing on the main diagonal blocks, $\Lambda^{(i)}$ of $\Lambda$, LU decomposition, $\Lambda^{(i)} = L^{(i)} U^{(i)}$, forward substitution, $L^{(i)} \underline{y}^{(i)} = \Lambda_A^{(i)H} F(\underline{r}_c)^{(i)}$, 55, and backward substitution, $U^{(i)}[F(\underline{d})]^{(i)} = \underline{y}^{(i)}$, 56. $L^{(i)}$ is a lower triangular matrix. $U^{(i)}$ is a an upper triangular matrix. $\Lambda_A^{(i)}$ is the $i^{th}$ main diagonal block of size SF by K in $\Lambda_A$ and $F(\underline{r}_c)^{(i)}$ is the $i^{th}$ block of size Q×1 in $F(\underline{r}_c)$. $\Lambda_A$ is the block DFT using PFA-FFT of the first column of $A_c$ and $F(\underline{r}_c)$ is the block DFT using PFA-FFT of the vector, $\underline{r}_c$. The estimated data vector, $\underline{d}$, is determined by a inverse block-DFT of $F(\underline{d})$, 57.

Although Equation 9 is a MMSE based solution, fast joint detection can be applied to other approaches, such as a zero forcing approach as per Equation 11.

$$R\underline{d}=(A^H A)\underline{d}=A^H \underline{r}$$

Equation 11

As shown in Equation 11, in the zero forcing solution, the $\sigma^2 I$ term is deleted from Equation 8. The following is a derivation for the MMSE solution, although an analogous derivation can be used for a zero forcing solution.

To reduce the complexity in determining $F(A^H \underline{r})$, a block DFT using PFA-FFT approach taking advantage of the block-Toeplitz structure of A may be used as shown in Equation 2. First, by repeating B, we extend A to a block-square matrix of size $D \cdot Q \times D \cdot K$, to use all of the chip symbols in the observation interval. The extended A is composed of $D^2$ blocks of size $Q \times K$. The extended A is approximated to the block-circulant matrix $A_c$.

$A_c$ can be decomposed into three matrices per Equation 12.

$$A_c = F_{(Q)}{}^H \Lambda_A F_{(K)}$$

Equation 12

$F_{(n)} = F \otimes I_n$ is a block DFT using PFA-FFT matrix of size $D \cdot n$ by $D \cdot n$. $\otimes$ denotes a kronecker product. $I_n$ is an identity matrix of size $n \times n$ and F is a DFT matrix of size $D \times D$, whose elements fil, i and l=1, 2, ..., D are per Equation 13.

$$f_{il} = \frac{1}{\sqrt{D}} \exp\left(-j\frac{2\pi i l}{D}\right)$$

Equation 13

D is the length of the DFT and $F^H F = I$. I is an identity matrix of size $D \times D$.

The block diagonal matrix $\Lambda_A$ is of size $D \cdot Q \times D \cdot K$ and has the form per Equation 14.

$$\Lambda_A = \begin{bmatrix} \Lambda_A^{(1)} & 0 & \cdots & 0 \\ 0 & \Lambda_A^{(2)} & \cdots & 0 \\ \vdots & \vdots & \ddots & \vdots \\ 0 & 0 & \cdots & \Lambda_A^{(D)} \end{bmatrix}$$

Equation 14

Each of its entries $\Lambda_A^{(i)}$, i=1, 2, ..., D, is a Q by K block per Equation 15.

$$\Lambda_A^{(i)} = \begin{bmatrix} \lambda_{1,1}^{(A,i)} & \cdots & \cdots & \lambda_{1,K}^{(A,i)} \\ \vdots & \ddots & & \vdots \\ \vdots & & \ddots & \vdots \\ \lambda_{Q,1}^{(A,i)} & \cdots & \cdots & \lambda_{Q,K}^{(A,i)} \end{bmatrix}$$

Equation 15

Alternatively, the main diagonal blocks, $\Lambda_A^{(i)}$, i=1, 2, ..., D, can be computed by, per Equation 16.

$$[\Lambda_A^{(1)T} \Lambda_A^{(2)T} \ldots \Lambda_A^{(D)T}]^T = (F_{(Q)} A_c(:, 1:K))$$

Equation 16

$A_c(:, 1:K)$ denotes the first block column of $A_c$. Namely, the first K columns of $A_c$. $F_{(SF)} A_c(:, 1:K)$ can be calculated by $Q \cdot K$ parallel non-block DFTs of length D, using PFA-FFTs.

Due to the extension of A, the received vector $\underline{r}$ is also extended by inserting zeros, becoming vector $\underline{r}_c$ of size $D \cdot Q$ by 1.

Using the above, $F(A^H \underline{r})$ is approximated to $F(A_c^H \underline{r}_c)$. It can be written as Equation 17.

$$F(A_c^H \underline{r}_c) = F_{(K)} \Lambda_A^H F_{(Q)} \underline{r}_c$$

Equation 17

The covariance matrix R of size $N_s \cdot K \times N_s \cdot K$ has the block-square matrix form shown in Equation 18.

$$R = \begin{bmatrix} R_0 & R_1^H & \cdots & R_L^H & \cdots & \cdots & \cdots & \cdots & 0 & \cdots & 0 & 0 \\ R_1 & R_0 & \ddots & \ddots & \ddots & & & & \ddots & & \vdots & \vdots \\ \vdots & R_1 & \ddots & \ddots & \ddots & \ddots & & & & \ddots & \vdots & \vdots \\ \vdots & & \ddots & \ddots & \ddots & \ddots & \ddots & & & & \vdots & \vdots \\ R_L & \vdots & \ddots & \ddots & \ddots & \ddots & \ddots & \ddots & & & \vdots & \vdots \\ 0 & R_L & \ddots & \ddots & \ddots & \ddots & \ddots & \ddots & \ddots & & \vdots & \vdots \\ \vdots & 0 & \ddots & R_L & \ddots & \ddots & \ddots & \ddots & \ddots & \ddots & \vdots & \vdots \\ \vdots & & \ddots & \ddots & \ddots & \ddots & \ddots & \ddots & \ddots & \ddots & 0 & \vdots \\ \vdots & & & \ddots & \ddots & \ddots & \ddots & \ddots & \ddots & \ddots & R_L^H & 0 \\ \vdots & & & & \ddots & \ddots & \ddots & \ddots & \ddots & \ddots & \vdots & R_L^H \\ \vdots & & & & & \ddots & \ddots & \ddots & \ddots & \ddots & \vdots & \vdots \\ 0 & 0 & \cdots & \cdots & \cdots & \cdots & \cdots & R_L & \cdots & R_1 & R_0 \end{bmatrix}$$

Equation 18

L is defined per Equation 19.

$$L = \left\lceil \frac{Q+W-1}{Q} \right\rceil$$

Equation 19

Each entry, $R_i$, in the R matrix is a K by K block and 0 is a K by K zero matrix. Due to the size of the extended A, the matrix R is also extended to size $D \cdot K$ by $D \cdot K$ by inserting zeros.

The extended R is approximated to a block-circulant matrix, $R_c$, of size $D \cdot K$ by $D \cdot K$ per Equation 20.

$$R_c = \begin{bmatrix} R_0 & R_1^H & \cdots & R_L^H & \cdots & \cdots & \cdots & 0 & \cdots & R_2 & R_1 \\ R_1 & R_0 & \ddots & \ddots & \ddots & & & & \ddots & \ddots & \vdots & \vdots \\ \vdots & R_1 & \ddots & \ddots & \ddots & \ddots & & & & \ddots & R_L & \vdots \\ \vdots & & \ddots & \ddots & \ddots & \ddots & \ddots & & & & \vdots & R_L \\ R_L & \vdots & \ddots & \ddots & \ddots & \ddots & \ddots & \ddots & & & \vdots & \vdots \\ 0 & R_L & \ddots & \ddots & \ddots & \ddots & \ddots & \ddots & \ddots & & \vdots & \vdots \\ \vdots & 0 & \ddots & R_L & \ddots & \ddots & \ddots & \ddots & \ddots & \ddots & \vdots & \vdots \\ \vdots & & \ddots & \ddots & \ddots & \ddots & \ddots & \ddots & \ddots & \ddots & 0 & \vdots \\ R_L^H & \vdots & \ddots & \ddots & \ddots & \ddots & \ddots & \ddots & \ddots & \ddots & R_L^H & 0 \\ \vdots & R_L^H & \ddots & \ddots & \ddots & \ddots & \ddots & \ddots & \ddots & \ddots & \vdots & R_L^H \\ \vdots & & \ddots & \ddots & \ddots & \ddots & \ddots & \ddots & \ddots & \ddots & \vdots & \vdots \\ R_1^H & R_2^H & \cdots & \cdots & \cdots & \cdots & \cdots & R_L & \cdots & R_1 & R_0 \end{bmatrix}$$

Equation 20

The block circulant matrix $R_c$ is decomposed into three matrices per Equation 21.

$$R_c = F_{(K)}{}^H \Lambda F_{(K)}$$

Equation 21

$F_{(K)} = F \otimes I_K$ is a block DFT using PFA-FFT matrix of size $D \cdot K \times D \cdot K$. $\otimes$ denotes a Kronecker product. $I_K$ is an identity matrix of size $K \times K$ and F is a DFT matrix of size $D \times D$ as described in Equation 13.

The block diagonal matrix A of size $D \cdot K$ by $D \cdot K$ has the form per Equation 22.

$$\Lambda = \begin{bmatrix} \Lambda^{(1)} & 0 & \cdots & 0 \\ 0 & \Lambda^{(2)} & \cdots & 0 \\ \vdots & \vdots & \ddots & \vdots \\ 0 & 0 & \cdots & \Lambda^{(D)} \end{bmatrix} \quad \text{Equation 22}$$

Each of its entries, $\Lambda^{(i)}$, i=1, 2, . . . , D, is a K by K block, per Equation 23A.

$$\Lambda^{(i)} = \begin{bmatrix} \lambda_{1,1}^{(i)} & \cdots & \cdots & \lambda_{1,K}^{(i)} \\ \vdots & \ddots & & \vdots \\ \vdots & & \ddots & \vdots \\ \lambda_{K,1}^{(i)} & \cdots & \cdots & \lambda_{K,K}^{(i)} \end{bmatrix} \quad \text{Equation 23A}$$

Alternatively, the main diagonal blocks, $\Lambda^{(i)}$, i=1, 2, . . . , D, can be computed per Equation 23B.

$$[\Lambda^{(1)T} \Lambda^{(2)T} \ldots \Lambda^{(D)T}]^T = (F_{(K)} R_c(:,1:K)) \quad \text{Equation 23B}$$

$R_c(:,1:K)$ denotes the first block column of $R_c$. Namely, the first K columns of $R_c$. $F_{(K)} R_c(:,1:K)$ can be calculated by $K^2$ parallel non-block DFTs of length D, using PFA_FFTs.

The estimated data vector, $\underline{d}$, in Equation 7 is preferably approximated per Equation 24A.

$$\begin{aligned} \underline{d} &= R^{-1} A^H \underline{r} \\ &\approx R_c^{-1} A_c^H \underline{r}_c \\ &= F_{(K)}^H \Lambda^{-1} \Lambda_A^H F_{(Q)} \underline{r}_c \end{aligned} \quad \text{Equation 24A}$$

The block diagonal matrix $\Lambda^{-1}$ is per Equation 24B.

$$\Lambda^{-1} = \begin{bmatrix} \Lambda^{(1)-1} & 0 & \cdots & 0 \\ 0 & \Lambda^{(2)-1} & \cdots & 0 \\ \vdots & \vdots & \ddots & \vdots \\ 0 & 0 & \cdots & \Lambda^{(D)-1} \end{bmatrix} \quad \text{Equation 24B}$$

The inversion of $\Lambda$ requires an inversion of K×K matrices, $\Lambda^{(i)}$, i=1, 2, . . . , D.

Equation 24A can be rewritten as Equation 25.

$$F(\underline{d}) = \Lambda^{-1} \Lambda_A^H F(\underline{r}_c) \quad \text{Equation 25}$$

$F(\underline{r}_c)$ is per Equations 26A and 26B.

$$F(\underline{r}_c) = F_{(Q)} \underline{r}_c \quad \text{Equation 26A}$$

$$F(\underline{d}_c) = F_{(K)} \underline{r}_c \quad \text{Equation 26B}$$

Due to the block-diagonal structure of $\Lambda^{-1}$ and $\Lambda_A^H$, Equation 25 can be efficiently calculated as follows. The terms of Equation 25 are partitioned into D blocks, as per Equation 27.

$$\begin{bmatrix} F(\underline{d})^{(1)} \\ F(\underline{d})^{(2)} \\ \vdots \\ F(\underline{d})^{(D)} \end{bmatrix} = \begin{bmatrix} \Lambda^{(1)-1} & & & \\ & \Lambda^{(2)-1} & & \\ & & \ddots & \\ & & & \Lambda^{(D)-1} \end{bmatrix} \begin{bmatrix} \Lambda_A^{(1)} & & & \\ & \Lambda_A^{(2)} & & \\ & & \ddots & \\ & & & \Lambda_A^{(D)} \end{bmatrix}^H \begin{bmatrix} F(\underline{r}_c)^{(1)} \\ F(\underline{r}_c)^{(2)} \\ \vdots \\ F(\underline{r}_c)^{(D)} \end{bmatrix} \quad \text{Equation 27}$$

Each block in Equation 27 is solved separately, per Equation 28.

$$F(\underline{d})^{(i)} = \Lambda^{(i)-1} \Lambda_A^{(i)H} F(\underline{r}_c)^{(i)} \quad \text{Equation 28}$$

$F(\underline{d})^{(i)}$ is a K by 1 vector. $\Lambda^{(i)}$ is a K by K matrix, per Equation 22. $\Lambda_A^{(i)}$ is an Q by K matrix, per Equation 14. $F(\underline{r}_c)^{(i)}$ is an Q by 1 vector and is composed of elements $(1+(i-1)Q)$ through $(i \cdot Q)$ of $F(\underline{r}_c)$.

To avoid the direct inversion of $\Lambda^{(i)}$, Equation 28 can be solved by using LU decomposition and forward and backward substitution. Equation 28 is rewritten per Equation 29.

$$\Lambda^{(i)} F(\underline{d})^{(i)} = \Lambda_A^{(i)H} F(\underline{r}_c)^{(i)} \quad \text{Equation 29}$$

$\Lambda^{(i)}$ is decomposed per Equation 30.

$$\Lambda^{(i)} = L^{(i)} U^{(i)} \quad \text{Equation 30}$$

$L^{(i)}$ is a lower triangular matrix and $U^{(i)}$ is an upper triangular matrix.

Using LU decomposition, Equation 28 is represented as, per Equation 31.

$$L^{(i)} U^{(i)} F(\underline{d})^{(i)} = \Lambda_A^{(i)H} F(\underline{r})^{(i)} \quad \text{Equation 31}$$

$F(\underline{d})^{(i)}$ in Equation 31 is solved by forward substitution, per Equation 32, and backward substitution, per Equation 33.

Forward Substitution: $L^{(i)} \underline{y}^{(i)} = \Lambda_A^{(i)H} F(\underline{r})^{(i)} \quad \text{Equation 32}$ Backward Substitution: $U^{(i)} [F(\underline{d})]^{(i)} = \underline{y}^{(i)} \quad \text{Equation 33}$ Finally, d is determined for all blocks as per Equation 34.

$$\underline{d} = F^{-1}(\underline{d}) = F^{-1} \left( \begin{bmatrix} F(\underline{d})^{(1)} \\ F(\underline{d})^{(2)} \\ \vdots \\ F(\underline{d})^{(D)} \end{bmatrix} \right) \quad \text{Equation 34}$$

Figure 6:
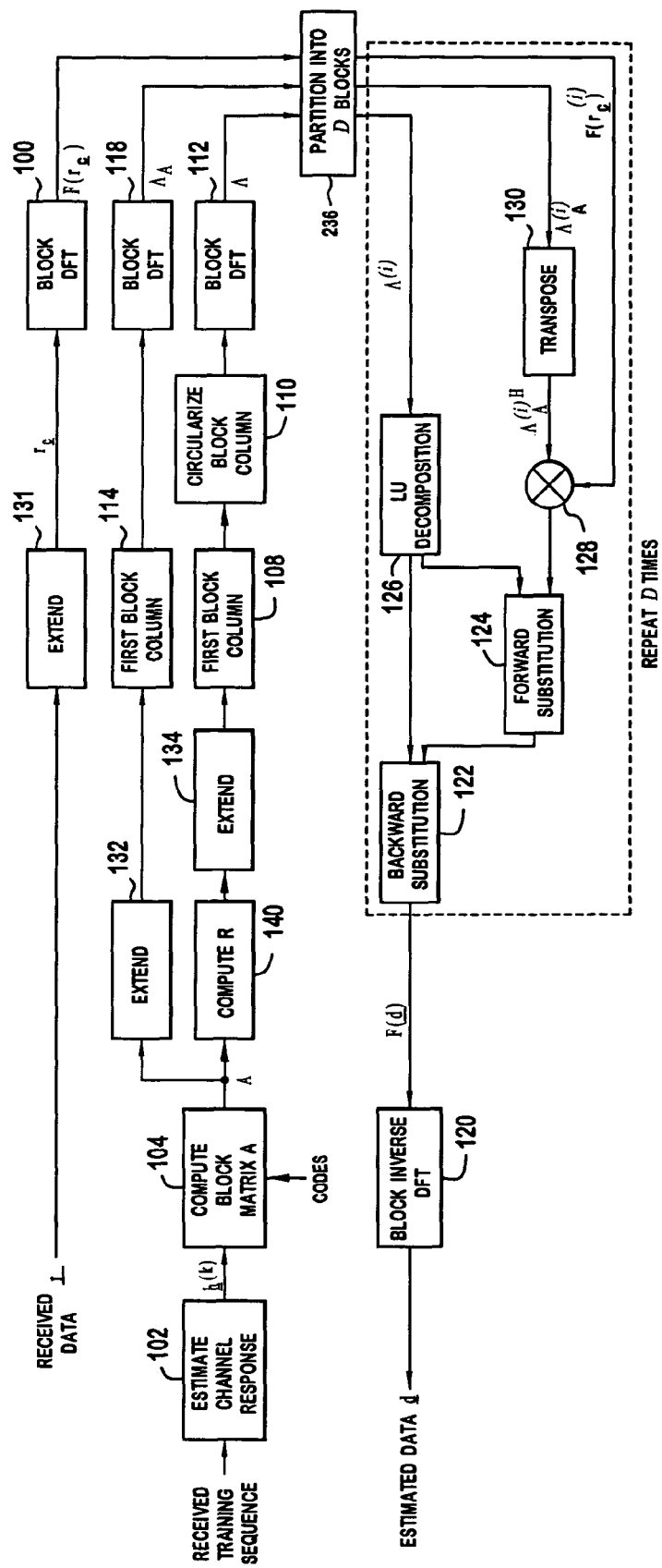
FIG. 6 is a block diagram of a preferred implementation of efficient joint detection.

FIG. 6 is a block diagram of a preferred implementation of efficient joint detection in a TDD/CDMA system. Using the received vector, $\underline{r}$, $\underline{r}_c$ is formed by inserting zeros, then a block DFT 100 of $\underline{r}_c$ is performed per Equation 26, to produce $F(\underline{r}_c)$.

Using the received training sequences, the channel impulse responses for each transmitted burst, $\underline{h}^{(k)}$, is determined by an estimate channel response block 102. Using each channelization code, $\underline{c}^{(k)}$ and the channel impulse response, $\underline{h}^{(k)}$, the system matrix, A, is determined by compute block matrix A block 104 per Equation 2.

To determine $\Lambda_A$, the system matrix A is extended by extend block 132, to use all received chips in the observation interval. The first block column of the block-circulant matrix $A_c$ is determined by selecting the first K columns of the extended A matrix by first block column block 114. By taking a block DFT using PFA-FFT 118 using PFA-FFT, $\Lambda_A$ is determined.

To determine $\Lambda$, R is first determined by compute R block 140. For an MMSE solution, $R=A^H A+\sigma^2 I$ is used; for a zero forcing solution, $R=A^H A$ is used. Due to the size of the extended A, R is also extended by extend block 134. The first block column of the extended R matrix is determined by selecting the first K columns of the extended R matrix by first block column block 108. The first block column of the extended R matrix is circularized by a circularize block column block 110. It becomes the first block column of a block-circulant $R_c$. By taking a block DFT using PFA-FFT by block DFT block 112, $\Lambda$ is determined.

To efficiently compute the estimated data vector $\underline{d}$, $\Lambda_A$, $\Lambda$, and $F(\underline{r}_c)$ are divided into blocks $\Lambda_A^{(i)}$, $\Lambda^{(i)}$, and $F(\underline{r}_c)^{(i)}$, $i=1, 2, \ldots, D$, respectively, exploiting the block-diagonal structures of $\Lambda_A$ and $\Lambda$, by partition block 136. The complex conjugate transpose of $\Lambda_A^{(i)}$, $\Lambda_A^{(i)H}$, is determined by a transpose block 130. A multiplier 128 multiplies $\Lambda_A^{(i)H}$ by $F(\underline{r}_c)^{(i)}$. $\Lambda^{(i)}$ is decomposed using LU decomposition by a LU decomposition block 126, per Equation 30. By performing forward and backward substitution, per Equations 31–33, using forward and backward substitution blocks 124 and 122, respectively, $F(\underline{d})^{(i)}$ is determined. By repeating the LU decomposition and forward and backward substitution D times, $F(\underline{d})$ is found. Taking a inverse block DFT using PFA-FFT of $F(\underline{d})$ by block inverse DFT block 120, $\underline{d}$ is estimated.

Figure 7:
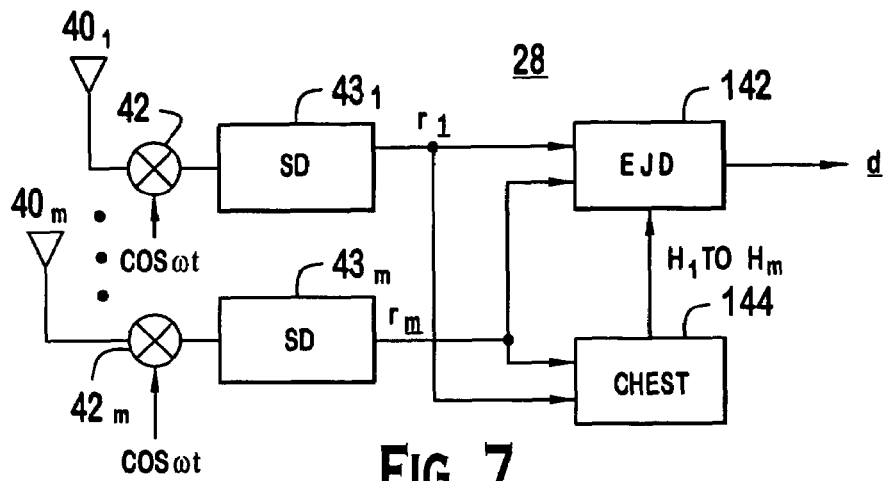
FIG. 7 is a simplified receiver having multiple antennas.
Figure 8:
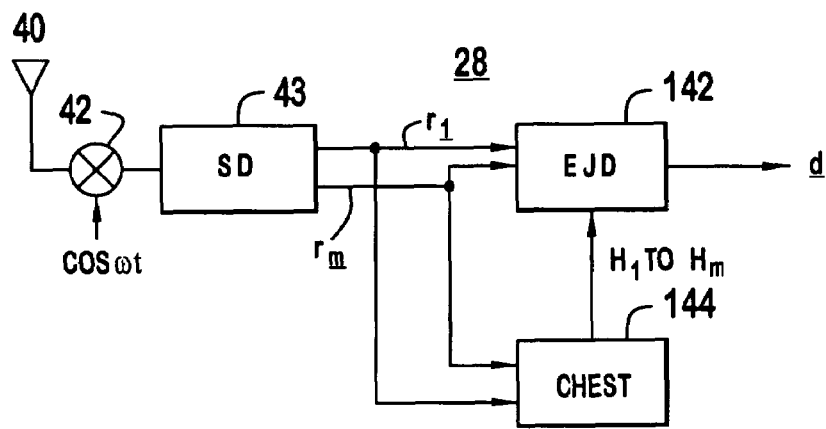
FIG. 8 is a simplified receiver sampling the received signal using fractional sampling.
Figure 9:
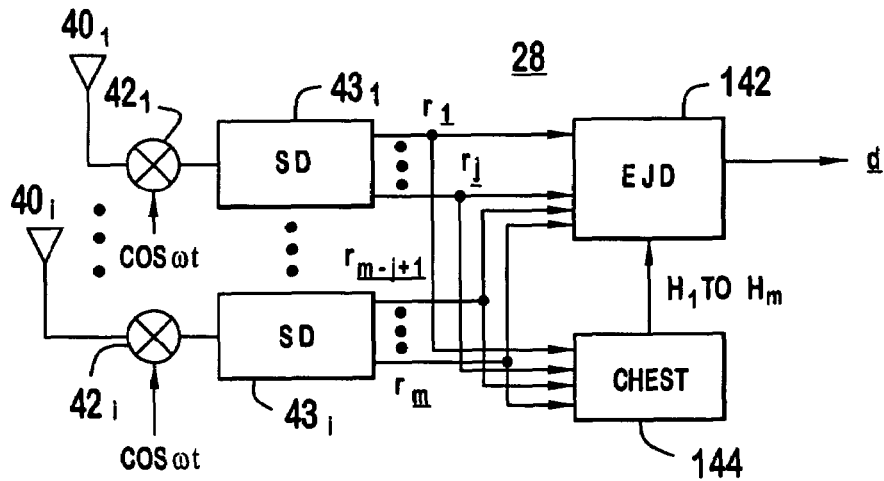
FIG. 9 is a simplified receiver having multiple antennas and using fractional sampling.

FIGS. 7, 8 and 9 are simplified diagrams of receivers applying efficient joint detection to multiple reception antennas and/or fractional (multiple chip rate) sampling. A receiver 28 with multiple reception antennas is shown in FIG. 7. Transmitted bursts are received by each antenna $40_1$ to $40_m$ (40). Each antennas' version of the received bursts are reduced to baseband, such as by demodulators $42_1$ to $42_m$. The baseband signals for each antenna are sampled by sampling devices $43_1$ to $43_m$ to produce a received vector, $\underline{r}_+$ to $\underline{r}_m$, for each antenna 40. The samples corresponding to the midamble are processed by a channel estimation device 144 to produce channel response matrices, $H_1$ to $H_m$, for each antenna 40. The received data vector, $\underline{d}$, is determined by an efficient joint detection device 142 using the received vectors and the channel response matrices.

A receiver 28 sampling using fraction sampling is shown in FIG. 8. Transmitted bursts are received by the antenna 40. The received bursts are reduced to baseband, such as by a demodulator 42. The baseband signal is sampled by a sampling device 43 to produce factional samples as received vectors, $\underline{r}_+$ to $\underline{r}_m$. Each received vector represents chip rate samples sampled at a fraction of a chip offset. To illustrate, for twice the chip rate sampling, two received vectors $\underline{r}_+$ and $\underline{r}_2$ are produced. Each of those vectors has samples spaced by half a chip in time. Samples corresponding to the midamble are processed by a channel estimation device 144 to produce channel response matices, $H_1$ to $H_m$, for each set of fractional samples. The received data vector, $\underline{d}$, is determined by an efficient joint detection device 142 using the received vectors and the channel response matrices.

A receiver 28 with multiple reception antennas and using fractional sampling is shown in FIG. 9. Transmitted bursts are received by each antenna $40_1$ to $40_j(40)$. Each antennas' version of the received bursts are reduced to baseband, such as by demodulators $42_1$ to $42_j$. The baseband signals for each antenna are sampled by sampling devices $43_1$ to $43j$ to produce a received vectors, $\underline{r}_+$ to $\underline{r}_m$. The received vectors for each antenna correspond to each multiple of the chip rate samples. The samples corresponding to the midamble are processed by a channel estimation device 144 to produce channel response matices, $H_1$ to $H_m$, for each antenna's fractional samples. The received data vector, $\underline{d}$, is determined by an efficient joint detection device 142 using the received vectors and the channel response matrices.

In applying efficient joint detection to either receive diversity, fractional sampling or both, the received communication bursts are viewed as M virtual chip rate received bursts. To illustrate, for twice the chip rate sampling and two antenna receive diversity, the received bursts are modeled as four (M=4) virtual chip rate received bursts.

Each received burst is a combination of K transmitted bursts. Each of the K transmitted bursts has its own code. The channel impulse response vector of the $k^{th}$ out of K codes and the $m^{th}$ out of the M virtual received bursts is $\underline{h}^{(k,m)}$. $\underline{h}^{(k,m)}$ has a length W and is estimated from the midamble samples of the burst of the $k^{th}$ code of the $m^{th}$ virtual received burst.

Each of the N data symbols of the burst of the $k^{th}$ code is per Equation 35.

$$\underline{d}^{(k)}=[d_1^{(k)} d_2^{(k)} \ldots d_N^{(k)}]^T, \quad 1 \leq k \leq K \qquad \text{Equation 35}$$

The code of the $k^{th}$ burst is per Equation 36.

$$\underline{c}^{(k)}=[c_1^{(k)} c_2^{(k)} \ldots c_Q^{(k)}]^T, \quad 1 \leq k \leq K \qquad \text{Equation 36}$$

The symbol response of the $k^{th}$ code's contribution to the $m^{th}$ virtual burst, $\underline{b}^{(k,m)}$ is per Equation 37.

$$\underline{b}^{(k,m)}=\underline{h}^{(k,m)} \circledast \underline{c}^{(k)} \qquad \text{Equation 37}$$

The length of the symbol response is Q+W−1. Q is the spreading factor. The system matrix, $A^{(m)}$, for each $m^{th}$ received burst is per Equation 38.

$$A^{(m)} = \begin{bmatrix} \boxed{B^{(m)}} \downarrow Q & & & \\ & \boxed{B^{(m)}} & & \\ & & \boxed{B^{(m)}} & \\ & & & \ddots \\ & & & & \boxed{B^{(m)}} \end{bmatrix} \qquad \text{Equation 38}$$

Each block $B^{(m)}$ is of size (Q+W−1) by K and is per Equation 39.

$$B^{(m)}=[\underline{b}^{(1,m)} \underline{b}^{(2,m)} \ldots \underline{b}^{(K,m)}] \qquad \text{Equation 39}$$

The overall system matrix A is per Equation 40.

$$A = \begin{bmatrix} A^{(1)} \\ A^{(2)} \\ \vdots \\ A^{(M)} \end{bmatrix} \qquad \text{Equation 40}$$

As shown in Equation 38, each sub-system matrix $A^{(m)}$ is block Toeplitz. The overall received vector of the M virtual bursts is of size M(NQ+W−1) and is per Equation 41.

$$\underline{r} = [\underline{r}_1^T \, \underline{r}_2^T \ldots \underline{r}_M^T]^T \qquad \text{Equation 41}$$

The $m^{th}$ received vector $\underline{r}_m$ is of size NQ+W−1 by 1.

Equation 42 is a model for the overall received vector.

$$\underline{r} = A\underline{d} + \underline{n} \qquad \text{Equation 42}$$

$\underline{n}$ is the noise variance.

Each $m^{th}$ received virtual burst is per Equation 43.

$$\underline{r}_m = A^{(m)}\underline{d} + \underline{n}_m \qquad \text{Equation 43}$$

$\underline{n}_m$ is the noise variance for the $m^{th}$ received virtual burst.

To solve for the data vector $\underline{d}$ in Equation 42, a block linear equalizer with either a zero forcing or minimum mean square error (MMSE) approach may be used per Equation 44.

$$\underline{d} = R^{-1} A^H \underline{r} \qquad \text{Equation 44}$$

R the covariance matrix.

For a zero forcing solution, R is per Equation 45.

$$R = \sum_{m=1}^{M} A^{(m)H} A^{(m)} = A^H A \qquad \text{Equation 45}$$

For a MMSE solution, R is per Equation 46.

$$R = \sum_{m=1}^{M} A^{(m)H} A^{(m)} + \sigma^2 I = A^H A + \sigma^2 I \qquad \text{Equation 46}$$

The covariance matrix for either the zero forcing or MMSE solution is a block Toeplitz. To apply a discrete Fourier transform to the block-Toeplitz $A^{(m)}$ matrix, a block-circulant approximation of $A^{(m)}$, $A_c^{(m)}$ is used. To make $A^{(m)}$ a block-square matrix, $A^{(m)}$ is extended. The extended $A^{(m)}$ matrix is then approximated to a block circulant matrix $A_c^{(m)}$.

The $A_c^{(m)}$ matrix is composed of D by D blocks. Each block is of size Q by K. Accordingly, the size of $A_c^{(m)}$ becomes DQ by DK. To include all the elements of $A^{(m)}$, D is chosen to be an integer larger than $D_{min}$ as determined per Equation 47.

$$D_{min} = \left\lceil N + \frac{(W-1)}{Q} \right\rceil \qquad \text{Equation 47}$$

$\lceil \cdot \rceil$ represents a round up to an integer function.

The covariance matrix R is a block-square matrix of size NK by NK with blocks of size K by K. For R to be compatible with the extended $A_c^{(m)}$ matrix, R is extended to the size DK by DK by zero-padding and approximating the extended R to a block circulant covariance matrix $R_c$. For the received vector, $r^{(m)}$, to be compatible with $A_c^{(m)}$ and $R_c$, $\underline{r}^{(m)}$ is extended to a DQ by 1 vector, $\underline{r}_c^{(m)}$ by zero padding.

After extending the received vectors, $\underline{r}^{(m)}$, the over all received vector is per Equation 48.

$$\underline{r}_c = [\underline{r}_c^{(1)T} \, \underline{r}_c^{(2)T} \ldots \underline{r}_c^{(M)T}]^T \qquad \text{Equation 48}$$

Each block-circulant matrix $A_c^{(m)}$ is diagonalized to a block-diagonal matrix by block discrete Fourier transform matrices per Equation 49.

$$A_c^{(m)} = F_{(Q)}^H \Lambda_A^{(m)} F_{(K)} \qquad \text{Equation 49}$$

$F_{(Q)}$ is per Equation 50.

$$F_{(Q)} = F \otimes I_Q \qquad \text{Equation 50}$$

$F_{(K)}$ is per Equation 51.

$$F_{(K)} = F \otimes I_K \qquad \text{Equation 51}$$

F is a discrete Fouriertrans form matrix of size D by D and is an n by n identity matrix. $\Lambda_A^{(m)}$ is a block diagonal matrix of the form of Equation 52.

$$\Lambda_A^{(m)} = \begin{bmatrix} \Lambda_A^{(1,m)} & 0 & \cdots & 0 \\ 0 & \Lambda_A^{(2,m)} & \cdots & 0 \\ \vdots & \vdots & \ddots & \vdots \\ 0 & 0 & \cdots & \Lambda_A^{(D,m)} \end{bmatrix} \qquad \text{Equation 52}$$

$\Lambda_A^{(l,m)}$ for l=1,…,D, and m=1,…,M is a non-zero block of size Q by K. 0 is a zero matrix of size Q by K having all zero elements.

$\Lambda_A^{(l,m)}$ is alternately computed per Equation 53.

$$\Lambda_A^{(m)} = \text{diag}^B(F_{(Q)} A_c^{(m)}(:,1:K)) \qquad \text{Equation 53}$$

$A_c^{(m)}(:,1:K)$ is the first block column of $A_c^{(m)}$. The first block column having K columns. To determine $\Lambda_A^{(m)}$, preferably $F_{(Q)} A_c^{(m)}(:,1:K)$ is determined by QK parallel non-block DFTs of length D, using PFA-FFTs. The block circulant matrix $R_c$ is also preferably diagonalized to the block diagonal matrix $\Lambda_R$ by a block DFT matrix $F_{(K)} = F \otimes I_K$ as per Equation 54.

$$R_c = F_{(K)}^H \Lambda_R F_{(K)} \qquad \text{Equation 54}$$

The block diagonal matrix $\Lambda_R$ is composed by blocks $\Lambda_R^{(l)}$, l=1,…,D of size K by K in its main diagonal block, per Equation 55.

$$\Lambda_R = \begin{bmatrix} \Lambda_R^{(1)} & 0 & \cdots & 0 \\ 0 & \Lambda_R^{(2)} & \cdots & 0 \\ \vdots & \vdots & \ddots & \vdots \\ 0 & 0 & \cdots & \Lambda_R^{(D)} \end{bmatrix} \qquad \text{Equation 55}$$

Another approach to determine $\Lambda_R$ is per Equation 56.

$$\Lambda_R = \text{diag}^B(F_{(K)} R_c(:,1:K)) \qquad \text{Equation 56}$$

$R_c(:,1:K)$ is the first block column of $R_c$. $F_{(K)} R_c(:,1:K)$ is preferably determined using $K^2$ parallel non-block DFTs of length D. In one implementation, the $K^2$ parallel non-block DFTs are implemented using $K^2$ parallel non-block prime factor algorithm fast Fourier transforms (PFA-FFTs) of length D.

Preferably to perform the block equalization of Equation 44, the matched filtering is approximated per Equation 57.

$$A^H \underline{r} \approx A_c^H \underline{r}_c = \sum_{m=1}^{M} A^{(m)H} \underline{r}_c^{(m)} \quad \text{Equation 57}$$

$$= \sum_{m=1}^{M} (F_{(Q)}^H \Lambda_A^{(m)} F_{(K)})^H \underline{r}_c^{(m)}$$

$$= F_{(K)}^H \sum_{m=1}^{M} \Lambda_A^{(m)H} F_{(Q)} \underline{r}_c^{(m)}$$

The block-diagonalization of $A_c^{(m)}$ is per Equation 58.

$$A_c = [A_c^{(1)T} \; A_c^{(2)T} \ldots A_c^{(M)T}]^T \quad \text{Equation 58}$$

The estimation of the data vector, $\underline{d}$, is per Equation 59.

$$\hat{\underline{d}} = R^{-1} A^H \underline{r} \approx R_c^{-1} A_c^H \underline{r}_c \quad \text{Equation 59}$$

$$= (F_{(K)}^H \Lambda_R F_{(K)})^{-1} F_{(K)}^H \sum_{m=1}^{M} (\Lambda_A^{(m)H} F_{(Q)} \underline{r}_c^{(m)})$$

$$= F_{(K)}^H \Lambda_R^{-1} F_{(K)} F_{(K)}^H \sum_{m=1}^{M} (\Lambda_A^{(m)H} F_{(Q)} \underline{r}_c^{(m)})$$

$$= F_{(K)}^H \Lambda_R^{-1} \sum_{m=1}^{M} (\Lambda_A^{(m)H} F_{(Q)} \underline{r}_c^{(m)})$$

$$= F_{(K)}^H \underline{y}$$

The vector $\underline{y}$ is of size DK by 1 and is per Equation 60.

$$\underline{y} = \Lambda_R^{-1} \sum_{m=1}^{M} (\Lambda_A^{(m)} F_{(Q)} \underline{r}_c^{(m)}) \quad \text{Equation 60}$$

$$= [\underline{y}^{(1)T} \; \underline{y}^{(2)T} \ldots \underline{y}^{(D)T}]^T$$

$\underline{y}^{(l)}$, $l=1, \ldots D$ is a vector of size K by 1.

Preferably to determine $\underline{y}$, $F_{(Q)} \underline{r}_c^{(m)}$ is determined using Q parallel non-block DFTs of a length D. In one implementation, the Q parallel non-block DFTs are implemented using Q parallel non-block PFA-FFTs of length D. $\Lambda_R^{-1}$ is a block diagonal matrix having blocks of size K by K in the main diagonal and is per Equation 61.

$$\Lambda_R^{-1} = \begin{bmatrix} \Lambda_R^{(1)-1} & 0 & \cdots & 0 \\ 0 & \Lambda_R^{(2)-1} & \cdots & 0 \\ \vdots & \vdots & \ddots & \vdots \\ 0 & 0 & \cdots & \Lambda_R^{(D)-1} \end{bmatrix} \quad \text{Equation 61}$$

Each $\Lambda_R^{(l)-1}$, $l=1, \ldots D$, is a block of size K by K.

Preferably using the block diagonal structure of $\Lambda_R^{-1}$, $\underline{y}^{(l)}$ is determined by the Cholesky decomposition of $\Lambda_R^{(l)}$ and forward and backward substitution in parallel. Alternately, $\Lambda^{R(l)}$ is directly inverted.

To perform the Cholesky decomposition, a vector $$\sum_{m=1}^{M} (\Lambda_A^{(m)H} F_{(Q)} \underline{r}_c^{(m)})$$

is divided into D blocks of a size K by 1, per Equation 62.

$$\underline{x} = \sum_{m=1}^{M} (\Lambda_A^{(m)H} F_{(Q)} \underline{r}_c^{(m)}) \quad \text{Equation 62}$$

$$= [\underline{x}^{(1)T} \; \underline{x}^{(2)T} \ldots \underline{x}^{(D)T}]^T$$

A Cholesky factor $G^{(l)}$ of $\Lambda_R^{(l)}$ is determined using a factorization, per Equation 63.

$$\Lambda_R^{(l)} = G^{(l)} G^{(l)H} \quad \text{Equation 63}$$

Using the Cholesky factor $G^{(l)}$, each $\underline{y}^{(l)}$ is determined by forward and backward substitution separately per Equations 64, 65 and 66.

$$\Lambda_R^{(l)} \underline{y}^{(l)} = G^{(l)} G^{(l)H} \underline{y}^{(l)} = \underline{x}^{(l)} \quad \text{Equation 64}$$

Forward Substitution: Find $\underline{z}$ in $G^{(l)} \underline{z}^{(l)} = \underline{x}^{(l)}$, where
$$\underline{z}^{(l)} \underline{y}^{(l)} \quad \text{Equation 65}$$

Backward Substitution: Find $\underline{y}^{(l)}$ in $\underline{z}^{(l)} = G^{(l)H} \underline{y}^{(l)}$ \quad \text{Equation 66}

By performing a block inverse DFT of $\underline{y}$, the data vector $\underline{d}$ is estimated as $\hat{\underline{d}}$. Preferably, the block inverse DFT is implemented using K parallel non-block inverse PFA-FFTs of a length D.

Figure 10:
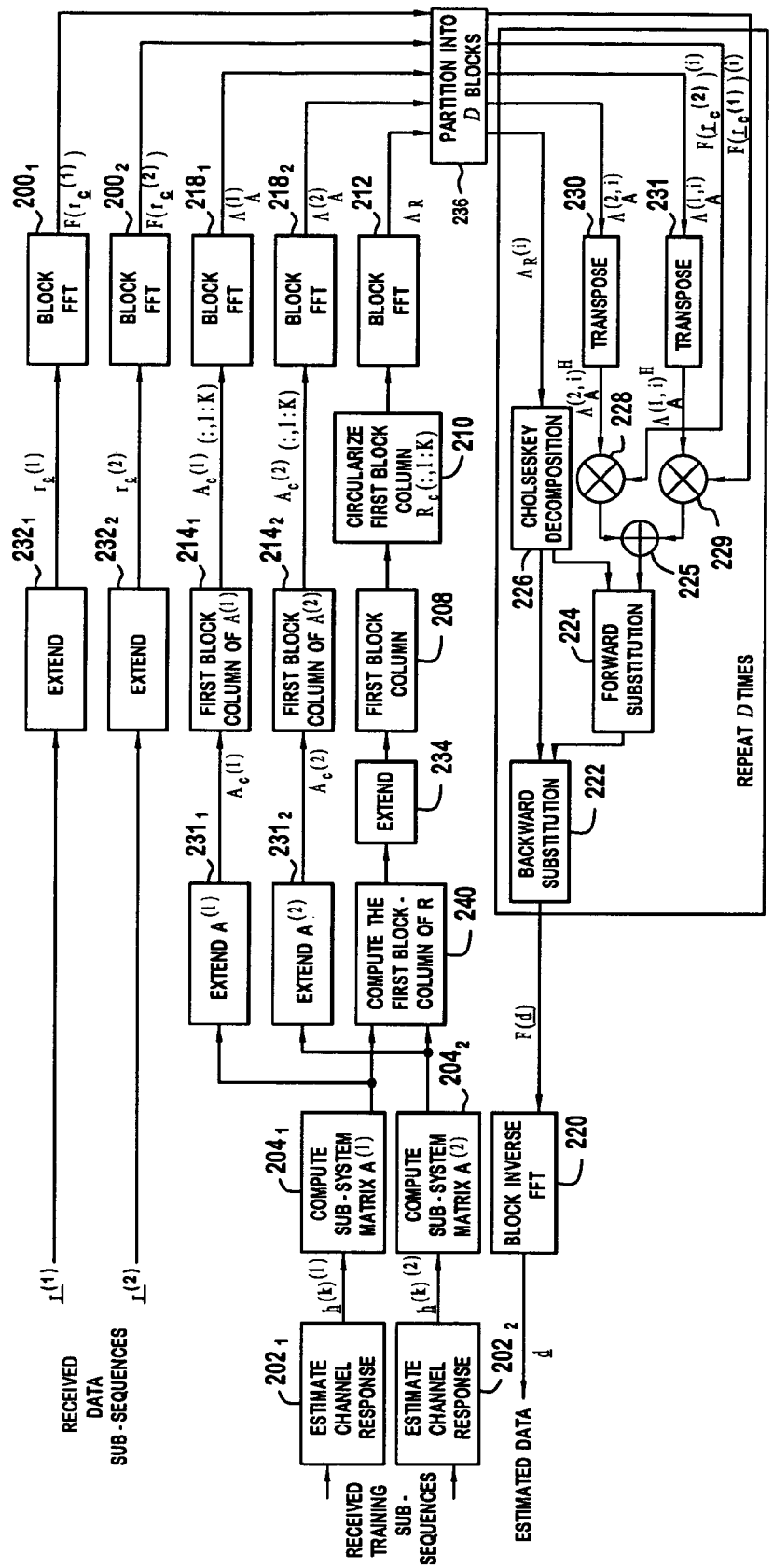
FIG. 10 is a block diagram of a preferred implementation of efficient joint detection for fractional sampling or receive diversity.

FIG. 10 is a block diagram of a preferred implementation of efficient joint detection in a TDD/CDMA system. Although FIG. 10 illustrates using two sets of samples, the figure can be extended to other multiple sets. Using the received vector for each set of chip rate samples, $\underline{r}_1$ and $\underline{r}_2$, $\underline{r}_c^{(1)}$ and $\underline{r}_c^{(2)}$ is formed by inserting zeros, by Extend blocks $232_1$ and $232_2$, respectively. A block DFT $200_1$ and $200_2$ using PFA-FFT of $\underline{r}_c^{(1)}$ and $\underline{r}_c^{(2)}$ is then performed, to produce $F_{(Q)} \underline{r}_c^{(1)}$ and $F_{(Q)} \underline{r}_c^{(2)}$.

Using the received training sequences, the channel impulse responses for each chip rate version of each transmitted burst, $\underline{h}^{(k)(1)}$ and $\underline{h}^{(k)(2)}$, is determined by estimate channel response blocks $202_1$ and $202_2$. Using each channelization code, $\underline{c}^{(k)}$ and the channel impulse response, $\underline{h}^{(k)(1)}$ and $\underline{h}^{(k)(2)}$, each system matrix, $A^{(1)}$ and $A^{(2)}$, is determined by compute sub-system matrix blocks $204_1$ and $204_2$ per Equations 37 and 38.

To determine $\Lambda_A^{(1)}$ and $\Lambda_A^{(2)}$, each system matrix, $A^{(1)}$ and $A^{(2)}$, is extended by extend blocks $231_1$ and $231_2$. The first block column of each block-circulant matrix, $A^{(1)}$ and $A^{(2)}$, is determined by selecting the first K columns of the extended $A^{(m)}$ matrix by first block column blocks $214_1$ and $214_2$. By taking block DFTs $218_1$ and $218_2$, $\Lambda_A^{(1)}$ and $\Lambda_A^{(2)}$ are determined using a PFA-FFT.

To determine $\Lambda_R$, the first block column of R is determined by compute first block column R block $240$. The first column of R is extended by extend block $234$. The first block column of the extended R is determined by a first block column determining device $208$. The first block column of the extended R matrix is circularized, $R_c$, by a circularize block column block $210$. By taking a block DFT by block DFT block $212$, $\Lambda_R^{()}$ is determined using a PFA-FFT.

To efficiently compute the estimated data vector $\underline{d}$, each of $\Lambda_A^{(1)}$, $\Lambda_A^{(2)}$ and $F(\underline{r}_c^{(1)})$ and $F(\underline{r}_c^{(2)})$ as well as $\Lambda_R$ are used. Each of $F(\underline{r}_c^{(1)})$, $F(\underline{c}^{(2)})$, $\Lambda_A^{(1)}$, $\Lambda_A^{(2)}$ and $\Lambda_R$ is divided into D blocks, by partition block 236. The complex conjugate transpose of each of $\Lambda_A^{(1,i)}$ and $\Lambda_A^{(2,i)}$, $\Lambda_A^{(1,i)^H}$ and $\Lambda_A^{(2,i)^H}$, where i is the $i^{th}$ block, is determined by transpose blocks 230, 231. A multiplier 228 multiplies $\Lambda_A^{(2,i)^H}$ by $F_{(Q)}(\underline{r}_c^{(2)})^{(i)}$. A multiplier 229 multiplies $\Lambda_A^{(1,i)^H}$ by $F_{(Q)}(\underline{r}_c^{(1)})^{(i)}$. A summer 225 sums the multiplied results per Equation 62. $\Lambda_R^{(i)}$ is decomposed using Cholesky decomposition 226, per Equation 63. By performing forward and backward substitution, per Equations 65 and 66, using forward and backward substitution blocks 224 and 222, respectively, $F(\underline{d})$ is determined. Taking an inverse block DFT using PFA-FFT of $F(\underline{d})$ by block inverse DFT block 220 using a PFA-FFT, $\underline{d}$ is estimated.

What is claimed is:

1. A method for detecting data from K data signals transmitted over a shared spectrum in a code division multiple access format, the method comprising:
  receiving and sampling a combined signal over the shared spectrum as a plurality of received vector versions, the combined signal including the K transmitted data signals;
producing a plurality of system matrices and an associated covariance matrix using codes and estimated impulse responses of the K data signals, each system matrix corresponding to a received vector version;
  extending and approximating the system and covariance matrices as block circulant matrices;
  determining a diagonal matrix of each of the extended and approximated system and covariance matrices, using a block column of the extended and approximated system and covariance matrices;
  extending and taking a Fourier transform of each received vector version;
  taking products of the diagonal matrices and the extended received vector versions;
  summing the products; and
  estimating data of the K data signals using an inverse Fourier transform and the summed products.

2. The method of claim 1 wherein the Fourier transforms are performed using a prime factor algorithm fast Fourier transform.

3. The method of claim 1 wherein each received vector version corresponds to a different reception antenna.

4. The method of claim 1 wherein the combined signal is sampled at a multiple of a chip rate of the K data signals and each received vector version corresponds to a different chip rate multiple.

5. The method of claim 1 wherein the K data signals are received over a plurality of antennas and sampled at a multiple of a chip rate of the K data signals and each received vector version corresponds to a different antenna and chip rate multiple combination.

6. The method of claim 1 further comprising partitioning the diagonal matrices into a plurality of partitions.

7. The method of claim 1 wherein the estimating data of the K data signals includes performing LU decomposition, forward substitution and backward substitution.

8. The method of claim 1 wherein the estimating data of the K data signals includes performing Cholesky decomposition, forward substitution and backward substitution.

9. The method of claim 1 wherein LU decomposition or Cholesky decomposition is performed on the diagonal of the covariance matrix.

10. A user equipment for detecting data from K data signals transmitted over a shared spectrum in a code division multiple access format, the user equipment comprising:
  means for receiving and sampling a combined signal over the shared spectrum as a plurality of received vector versions, the combined signal including the K transmitted data signals;
  means for producing a plurality of system matrices and an associated covariance matrix using codes and estimated impulse responses of the K data signals, each system matrix corresponding to a received vector version;
  means for extending and approximating the system and covariance matrices as block circulant matrices;
  means for determining a diagonal matrix of each of the extended and approximated system and covariance matrices, using a block column of the extended and approximated system and covariance matrices;
  means for extending and taking a Fourier transform of each received vector version;
  means for taking products of the diagonal matrices and the extended received vector versions;
  means for summing the products; and
  means for estimating data of the K data signals using an inverse Fourier transform and the summed products.

11. The user equipment of claim 10 wherein the Fourier transforms are performed using a prime factor algorithm fast Fourier transform.

12. The user equipment of claim 10 wherein each received vector version corresponds to a different reception antenna.

13. The user equipment of claim 10 wherein the combined signal is sampled at a multiple of a chip rate of the K data signals and each received vector version corresponds to a different chip rate multiple.

14. The user equipment of claim 10 wherein the K data signals are received over a plurality of antennas and sampled at a multiple of a chip rate of the K data signals and each received vector version corresponds to a different antenna and chip rate multiple combination.

15. The user equipment of claim 10 further comprising means for partitioning the diagonal matrices into a plurality of partitions.

16. The user equipment of claim 10 wherein the estimating data of the K data signals includes performing LU decomposition, forward substitution and backward substitution.

17. The user equipment of claim 10 wherein the estimating data of the K data signals includes performing Cholesky decomposition, forward substitution and backward substitution.

18. The user equipment of claim 10 wherein LU decomposition is performed on the diagonal of the covariance matrix.

19. The user equipment of claim 10 wherein Cholesky decomposition is performed on the diagonal of the covariance matrix.

20. A user equipment for detecting data from K data signals transmitted over a shared spectrum in a code division multiple access format, the user equipment comprising:
  an antenna and a sampling device for receiving a combined signal over the shared spectrum as a plurality of received vector versions, the combined signal including the K transmitted data signals;
  a plurality of compute sub-system matrix blocks for producing a plurality of system matrices using estimated impulse responses of the K data signals, each system matrix corresponding to a received vector version;

a compute covariance matrix block for producing a covariance matrix associated with the system matrices;
a plurality of extension blocks for extending the system and covariance matrices;
a plurality of first block column devices for approximating the extended system and covariance matrices as block circulant matrices;
a plurality of block Fourier transform devices for determining a diagonal matrix of each of the extended and approximated system and covariance matrices, using a block column of the extended and approximated system and covariance matrices;
an extension device for extending each received vector version;
a block Fourier transform device for taking a Fourier transform of each received vector version;
a plurality of multipliers for taking products of the diagonal matrices and the extended received vector versions;
a summer for summing the products; and
a block inverse Fourier transform device for estimating data of the K data signals using an inverse Fourier transform and the summed products.

21. The user equipment of claim 20 wherein the Fourier transforms are performed using a prime factor algorithm fast Fourier transform.

22. The user equipment of claim 20 wherein each received vector version corresponds to a different reception antenna.

23. The user equipment of claim 20 wherein the combined signal is sampled at a multiple of a chip rate of the K data signals and each received vector version corresponds to a different chip rate multiple.

24. The user equipment of claim 20 wherein the K data signals are received over a plurality of antennas and sampled at a multiple of a chip rate of the K data signals and each received vector version corresponds to a different antenna and chip rate multiple combination.

25. The user equipment of claim 20 further comprising a partitioning device for partitioning the diagonal matrices into a plurality of partitions.

26. The user equipment of claim 20 further comprising a LU decomposition device for performing LU decomposition on the diagonal of the covariance matrix, a forward substitution device and a backward substitution device for producing an inverse Fourier transform of the estimated data vector.

27. The user equipment of claim 20 further comprising a Cholesky decomposition device for performing Cholesky decomposition on the diagonal of the covariance matrix, a forward substitution device and a backward substitution device for producing an inverse Fourier transform of the estimated data vector.

28. A base station for detecting data from K data signals transmitted over a shared spectrum in a code division multiple access format, the base station comprising:
means for receiving and sampling a combined signal over the shared spectrum as a plurality of received vector versions, the combined signal including the K transmitted data signals;
means for producing a plurality of system matrices and an associated covariance matrix using codes and estimated impulse responses of the K data signals, each system matrix corresponding to a received vector version;
means for extending and approximating the system and covariance matrices as block circulant matrices;
means for determining a diagonal matrix of each of the extended and approximated system and covariance matrices, using a block column of the extended and approximated system and covariance matrices;
means for extending and taking a Fourier transform of each received vector version;
means for taking products of the diagonal matrices and the extended received vector versions;
means for summing the products; and
means for estimating data of the K data signals using an inverse Fourier transform and the summed products.

29. The base station of claim 28 wherein the Fourier transforms are performed using a prime factor algorithm fast Fourier transform.

30. The base station of claim 28 wherein each received vector version corresponds to a different reception antenna.

31. The base station of claim 28 wherein the combined signal is sampled at a multiple of a chip rate of the K data signals and each received vector version corresponds to a different chip rate multiple.

32. The base station of claim 28 wherein the K data signals are received over a plurality of antennas and sampled at a multiple of a chip rate of the K data signals and each received vector version corresponds to a different antenna and chip rate multiple combination.

33. The base station of claim 28 further comprising means for partitioning the diagonal matrices into a plurality of partitions.

34. The base station of claim 28 wherein the estimating data of the K data signals includes performing LU decomposition , forward substitution and backward substitution.

35. The base station of claim 28 wherein the estimating data of the K data signals includes performing Cholesky decomposition, forward substitution and backward substitution.

36. The base station of claim 28 wherein LU decomposition is performed on the diagonal of the covariance matrix.

37. The base station of claim 28 wherein Cholesky decomposition is performed on the diagonal of the covariance matrix.

38. A base station for detecting data from K data signals transmitted over a shared spectrum in a code division multiple access format, the base station comprising:
an antenna and a sampling device for receiving a combined signal over the shared spectrum as a plurality of received vector versions, the combined signal including the K transmitted data signals;
a plurality of compute sub-system matrix blocks for producing a plurality of system matrices using estimated impulse responses of the K data signals, each system matrix corresponding to a received vector version;
a compute covariance matrix block for producing a covariance matrix associated with the system matrices;
a plurality of extension blocks for extending the system and covariance matrices;
a plurality of first block column devices for approximating the extended system and covariance matrices as block circulant matrices;
a plurality of block Fourier transform devices for determining a diagonal matrix of each of the extended and approximated system and covariance matrices, using a block column of the extended and approximated system and covariance matrices;
an extension device for extending each received vector version;
a block Fourier transform device for taking a Fourier transform of each received vector version;

a plurality of multipliers for taking products of the diagonal matrices and the extended received vector versions;
a summer for summing the products; and
a block inverse Fourier transform device for estimating data of the K data signals using an inverse Fourier transform and the summed products.

39. The base station of claim 38 wherein each received vector version corresponds to a different reception antenna.

40. The base station of claim 38 wherein the combined signal is sampled at a multiple of a chip rate of the K data signals and each received vector version corresponds to a different chip rate multiple.

41. The base station of claim 38 wherein the K data signals are received over a plurality of antennas and sampled at a multiple of a chip rate of the K data signals and each received vector version corresponds to a different antenna and chip rate multiple combination.

42. The base station of claim 38 further comprising a partitioning device for partitioning the diagonal matrices into a plurality of partitions.

43. The base station of claim 38 further comprising a LU decomposition device for performing LU decomposition on the diagonal of the covariance matrix, a forward substitution device and a backward substitution device for producing an inverse Fourier transform of the estimated data vector.

44. The base station of claim 38 further comprising a Cholesky decomposition device for performing Cholesky decomposition on the diagonal of the covariance matrix, a forward substitution device and a backward substitution device for producing an inverse Fourier transform of the estimated data vector.

45. A method for receiving a plurality of data signals transmitted over a shared spectrum in a code division multiple access communication system, the method comprising:
   receiving and sampling a combined signal having the plurality of transmitted data signals to produce a received vector;
   determining a channel response for the plurality of transmitted data signals;
   determining a system response matrix using the determined channel response and codes of the transmitted data signals;
   determining a covariance matrix using the system response matrix;
   extending the received vector, the system response matrix and the determined covariance matrix;
   taking a block discrete Fourier transform of a block column of the extended covariance matrix;
   taking a block discrete Fourier transform of a block column of the system response matrix;
   taking a block discrete Fourier transform of the received vector; and
   determining an extended data vector using the block discrete Fourier transforms.

46. The method of claim 45 further comprising partitioning the block discrete Fourier transforms.

47. The method of claim 45 further comprising performing LU decomposition on the block Fourier transforms.

48. A user equipment for detecting data from K data signals transmitted over a shared spectrum in a code division multiple access format, the user equipment comprising:
   an antenna and a sampling device for receiving and sampling a combined signal having the plurality of transmitted data signals to produce a received vector;
   a channel estimation device for determining a channel response for the plurality of transmitted data signals;
   a compute block matrix device for determining a system response matrix using the determined channel response and codes of the transmitted data signals;
   a compute covariance matrix device for determining a covariance matrix using the system response matrix;
   a plurality of extend devices for extending the received vector, the system response matrix and the determined covariance matrix;
   a block discrete Fourier transform device for taking a block discrete Fourier transform of a block column of the extended covariance matrix;
   a block discrete Fourier transform device for taking a block discrete Fourier transform of a block column of the system response matrix;
   a block discrete Fourier transform device for taking a block discrete Fourier transform of the received vector; and
   a circuit for determining an extended data vector using the block discrete Fourier transforms.

49. The user equipment of claim 48 further comprising a partitioning device for partitioning the block discrete Fourier transforms.

50. The user equipment of claim 48 wherein the circuit comprises a LU decomposition device for performing LU decomposition on the block Fourier transforms.

51. A user equipment for detecting data from K data signals transmitted over a shared spectrum in a code division multiple access format, the user equipment comprising:
   means for receiving and sampling a combined signal having the plurality of transmitted data signals to produce a received vector;
   means for determining a channel response for the plurality of transmitted data signals;
   means for determining a system response matrix using the determined channel response and codes of the transmitted data signals;
   means for determining a covariance matrix using the system response matrix;
   means for extending the received vector, the system response matrix and the determined covariance matrix;
   means for taking a block discrete Fourier transform of a block column of the extended covariance matrix;
   means for taking a block discrete Fourier transform of a block column of the system response matrix;
   means for taking a block discrete Fourier transform of the received vector; and
   means for determining an extended data vector using the block discrete Fourier transforms.

52. The user equipment of claim 51 further comprising means for partitioning the block discrete Fourier transforms.

53. The user equipment of claim 51 wherein the means for determining an extended data vector comprises a LU decomposition device for performing LU decomposition on the block Fourier transforms.

54. A base station for detecting data from K data signals transmitted over a shared spectrum in a code division multiple access format, the base station comprising:
   an antenna and a sampling device for receiving and sampling a combined signal having the plurality of transmitted data signals to produce a received vector;
   a channel estimation device for determining a channel response for the plurality of transmitted data signals;
   a compute block matrix device for determining a system response matrix using the determined channel response and codes of the transmitted data signals;
   a compute covariance matrix device for determining a covariance matrix using the system response matrix;

a plurality of extend devices for extending the received vector, the system response matrix and the determined covariance matrix;

a block discrete Fourier transform device for taking a block discrete Fourier transform of a block column of the extended covariance matrix;

a block discrete Fourier transform device for taking a block discrete Fourier transform of a block column of the system response matrix;

a block discrete Fourier transform device for taking a block discrete Fourier transform of the received vector; and a circuit for determining an extended data vector using the block discrete Fourier transforms.

55. The base station of claim 54 further comprising a partitioning device for partitioning the block discrete Fourier transforms.

56. The base station of claim 54 wherein the circuit comprises a LU decomposition device for performing LU decomposition on the block Fourier transforms.

57. A base station for detecting data from K data signals transmitted over a shared spectrum in a code division multiple access format, the base station comprising:

means for receiving and sampling a combined signal having the plurality of transmitted data signals to produce a received vector;

means for determining a channel response for the plurality of transmitted data signals;

means for determining a system response matrix using the determined channel response and codes of the transmitted data signals;

means for determining a covariance matrix using the system response matrix;

means for extending the received vector, the system response matrix and the determined covariance matrix;

means for taking a block discrete Fourier transform of a block column of the extended covariance matrix;

means for taking a block discrete Fourier transform of a block column of the system response matrix;

means for taking a block discrete Fourier transform of the received vector; and means for determining an extended data vector using the block discrete Fourier transforms.

58. The base station of claim 57 further comprising means for partitioning the block discrete Fourier transforms.

59. The base station of claim 57 wherein the means for determining an extended data vector comprises a LU decomposition device for performing LU decomposition on the block Fourier transforms.

* * * * *

UNITED STATES PATENT AND TRADEMARK OFFICE
CERTIFICATE OF CORRECTION

PATENT NO. : 7,289,552 B2
APPLICATION NO. : 10/644361
DATED : October 30, 2007
INVENTOR(S) : Kwak et al.

It is certified that error appears in the above-identified patent and that said Letters Patent is hereby corrected as shown below:

ON THE TITLE PAGE

At section (56), FOREIGN PATENT DOCUMENTS, page 1, right column, delete line 1, and insert therefor --WO 99/40698 8/1999--.

At section (56), OTHER PUBLICATIONS, page 2, right column, line 9, after the word "Journal", delete "in" and insert therefor --on--.

IN THE DRAWINGS

Figure 4B:
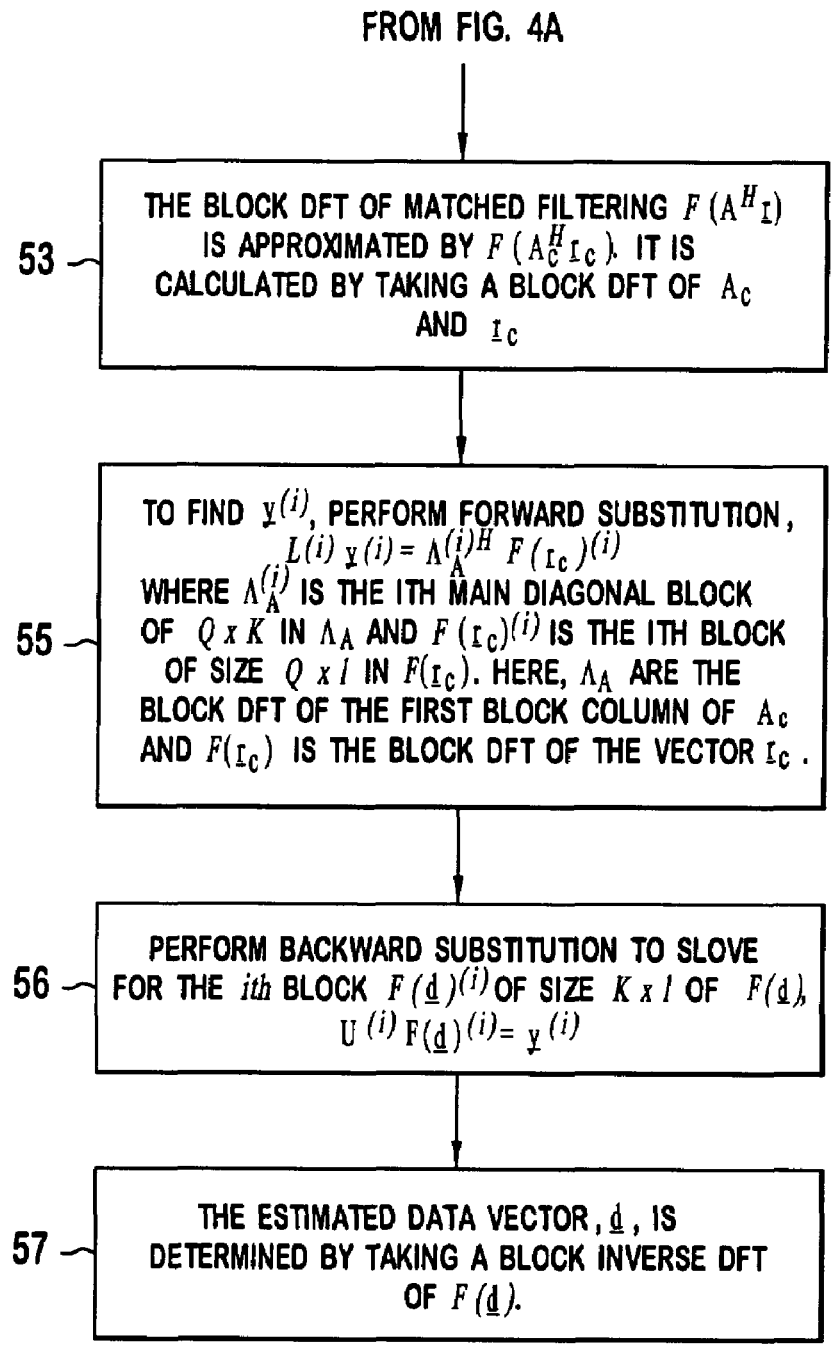
Figure 5:
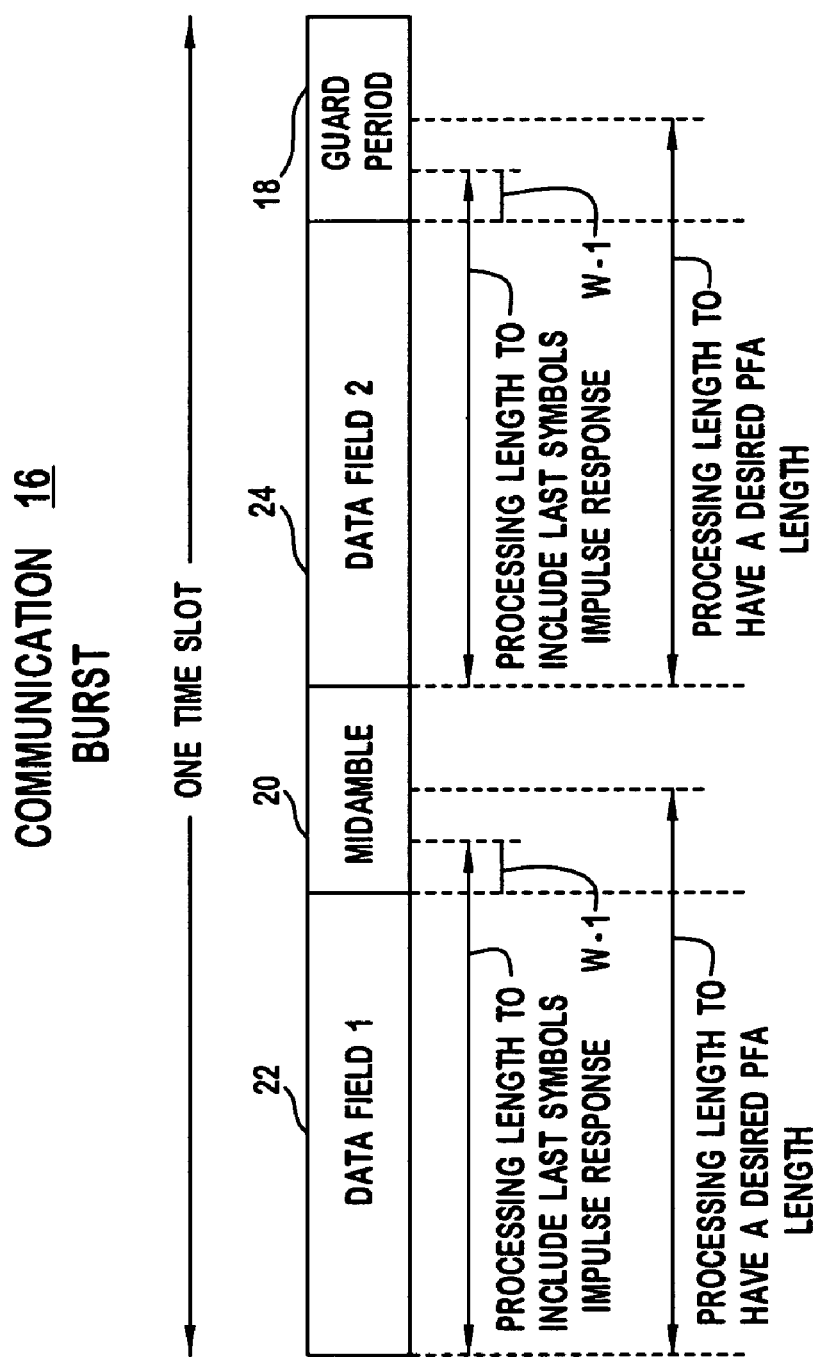
FIG. 5 is an illustration of a data burst indicating extended processing areas.

At FIG. 4B, block #56, top line, after the word "TO", delete "SLOVE" and insert therefor --SOLVE--.

At FIG. 10, block #226, top line, delete "CHOLSESKEY", and insert therefor --CHOLESKY--.

IN THE SPECIFICATION

At column 4, line 7, before the word "function", delete "hermetian" and insert therefor --Hermitian--.

At column 4, line 61, before the words "an upper", delete "a".

At column 4, line 66, before the word "inverse", delete "a" and insert therefor --an--.

At column 5, line 24, before the word "product", delete "kronecker" and insert therefor --Kronecker--.

At column 5, line 26, after the word "elements", delete "fil" and insert therefor --$f_{il}$--.

At column 6, line 66, after the word "matrix", delete "A" and insert therefor --$\Lambda$--.

At column 7, line 44, after the word "using", delete "PFA_FFTs", and insert therefor --PFA-FFTs--.

At column 8, line 34, before "Q by K", delete "an" and insert therefor --a--.

UNITED STATES PATENT AND TRADEMARK OFFICE
CERTIFICATE OF CORRECTION

PATENT NO. : 7,289,552 B2
APPLICATION NO. : 10/644361
DATED : October 30, 2007
INVENTOR(S) : Kwak et al.

It is certified that error appears in the above-identified patent and that said Letters Patent is hereby corrected as shown below:

At column 8, line 35, before "Q by 1", delete "an" and insert therefor --a--.

At column 8, line 48, before the word "Equation", delete "decom position" and insert therefor --decomposition--.

At column 9, line 42, before the word "inverse", delete "a" and insert therefor --an--.

At column 10, line 15, before the word "received", delete "a".

At column 10, delete Equation 35 and insert therefor --$\underline{d}^{(k)} = [d_1^{(k)} d_2^{(k)} \ldots d_N^{(k)}]^T$, $1 \leq k \leq K$--.

At column 11, delete Equation 41, and insert therefor --$\underline{r} = [r_1^T \underline{r}_2^T \ldots \underline{r}_M^T]^T$--.

At column 11, line 33, after "R", insert --is--.

At column 12, line 8, after "$\underline{r}^{(m)}$, the", delete "over all" and insert therefor --overall--.

At column 12, line 23, before the word "matrix", delete "Fouriertrans form" and insert therefor --Fourier transform--.

At column 13, delete Equation 58, and insert therefor -- $A_c = \left[ A_c^{(1)^T} A_c^{(2)^T} \ldots A_c^{(M)^T} \right]^T$ --.

At column 13, delete 5$^{th}$ segment of Equation 59, line 34, and insert therefor --$= F_{(K)}^H \underline{y}$--.

At column 13, line 67, before the words "is directly", delete "$\Lambda^{R(1)}$" and insert therefor --$\Lambda_R^{(1)}$--.

At column 14, delete Equation 65, and insert thereof
--Forward Substitution: Find $\underline{z}^{(1)}$ in $G^{(1)} \underline{z}^{(1)} = \underline{x}^{(1)}$, where $\underline{z}^{(1)} = G^{(1)^H} \underline{y}^{(1)}$ --.

UNITED STATES PATENT AND TRADEMARK OFFICE
CERTIFICATE OF CORRECTION

PATENT NO.        : 7,289,552 B2
APPLICATION NO.   : 10/644361
DATED             : October 30, 2007
INVENTOR(S)       : Kwak et al.

It is certified that error appears in the above-identified patent and that said Letters Patent is hereby corrected as shown below:

At column 15, line 3, after "$F(\underline{r}_c^{(1)})$", delete "$F(\underline{c}^{(2)})$" and insert therefor --$F(\underline{r}_c^{(2)})$,--.

Signed and Sealed this

Twenty-seventh Day of May, 2008

JON W. DUDAS
*Director of the United States Patent and Trademark Office*